United States Patent [19]

Swiatowy et al.

[11] Patent Number: 5,054,342

[45] Date of Patent: Oct. 8, 1991

[54] PIPE MACHINING APPARATUS

[75] Inventors: Jeffrey M. Swiatowy, Palatine; Keith P. Polifka, Wheeling, both of Ill.

[73] Assignee: The E.H. Wachs Company, Wheeling, Ill.

[21] Appl. No.: 349,511

[22] Filed: May 9, 1989

[51] Int. Cl.⁵ .............................................. B23B 5/08
[52] U.S. Cl. ....................................... 82/113; 82/128; 82/130; 82/147
[58] Field of Search ............... 82/113, 128, 147, 130, 82/131; 384/114, 229, 263, 275, 229, 456, 616, 255; 30/97, 96, 95, 98; 29/148.4 A

[56] References Cited

U.S. PATENT DOCUMENTS

| | | | |
|---|---|---|---|
| 1,181,999 | 5/1916 | Drake | 384/616 |
| 1,584,828 | 5/1926 | Wood | 384/255 |
| 2,581,455 | 1/1952 | Stempel | 384/616 |
| 3,164,062 | 6/1961 | Hogden et al. | 82/113 |
| 3,635,103 | 1/1972 | Monti | 384/255 |
| 3,807,047 | 4/1974 | Sherer et al. | 82/113 |
| 3,917,365 | 11/1975 | Jennes | 384/310 |
| 4,054,999 | 10/1977 | Harbottle | 29/148.4 A |
| 4,106,192 | 8/1978 | Stahlecker | 384/616 |
| 4,199,201 | 4/1980 | Trzeciak | 384/616 |
| 4,318,391 | 3/1982 | Wachs et al. | 125/14 |
| 4,366,994 | 1/1983 | Yoshioka | 384/255 |
| 4,490,909 | 1/1985 | Wachs et al. | 30/97 |
| 4,543,861 | 10/1985 | Kwech et al. | 82/4 |
| 4,655,108 | 4/1987 | Galos | 82/38 |
| 4,668,108 | 5/1987 | McHugh | 384/310 |
| 4,677,884 | 7/1987 | Kwech et al. | 82/4 |
| 4,687,348 | 8/1987 | Naruoka et al. | 384/255 |
| 4,739,685 | 4/1988 | Ricci | 82/4 |
| 4,754,672 | 7/1988 | VanderPol | 82/128 |
| 4,762,038 | 8/1988 | Olson | 82/4 |
| 4,770,074 | 9/1988 | Kwech | 82/128 |
| 4,791,842 | 12/1988 | Olson | 82/4 |
| 4,829,860 | 5/1989 | VanderPol | 82/113 |

Primary Examiner—James G. Smith
Assistant Examiner—Blynn Shideler
Attorney, Agent, or Firm—Wood, Phillips, Mason, Recktenwald & VanSanten

[57] ABSTRACT

A pipe machining apparatus includes a tool carrier, with a frame attachable to a pipe for rotatably mounting the tool carrier. The tool carrier is circumferentially rotatable about the pipe and carries a tool for performing cutting or machining operations on the pipe. A plurality of rotatable bearings are provided between the frame and the tool carrier, and the bearings are individually adjustable in a radial direction to compensate for wear of the bearings during use of the apparatus.

17 Claims, 2 Drawing Sheets

PIPE MACHINING APPARATUS

FIELD OF THE INVENTION

This invention generally relates to a pipe machining apparatus and, more particularly, to such apparatus that is usable on site for cutting pipe or for preparing the end of a pipe preparatory to an operation, such as welding another pipe thereto.

BACKGROUND OF THE INVENTION

There are various forms of pipe machining apparatus known in the art. Some such apparatus are portable and include a frame which can be accurately secured to a pipe. The frame rotatably mounts a tool carrier. A tool head is mounted on the tool carrier whereby a tool may be advanced during rotation of the tool carrier and head to perform a desired cutting operation on the pipe. The tool head usually is incrementally advanced by a tool slide.

Examples of various pipe machining apparatus or portable lathes are shown in U.S. Pat. Nos. 4,791,842; 4,762,038; 4,677,884; 4,655,108; 4,543,861; 4,490,909 and 4,318,391, all of which are assigned to the assignee of this invention.

Most such apparatus have some form of bearing means between the frame which is attached to the pipe and the tool carrier which is rotatably mounted on the frame. Usually, the bearings are rotatably mounted on one of the carrier or frame and travel in a race formed in the other of the carrier or frame. Because of the relative loads imposed between the frame and the rotatable tool carrier during cutting operations, various bearing problems occur. For instance, problems arise due to bearing failure which may result in having to dismantle or replace entire machine parts. A solution to such bearing failure problems is shown in U.S. Pat. No. 4,739,685 wherein a replaceable bearing race is provided.

Another problem involves wear of the bearings during use. Usually, a plurality of roller bearings, or the like, are disposed in the race between the frame and the rotatable tool carrier. As the bearings wear, a smooth rotating operation no longer occurs. In addition, the individual bearings normally will not wear evenly, resulting in a loss of concentricity for the cutting tool whereby precision machining no longer is possible. There is a definite need for an improved pipe machining apparatus which can compensate for wear in the bearing means between the frame and the rotatable tool carrier.

This invention is directed to satisfying such a need and solving the problems referred to above.

SUMMARY OF THE INVENTION

An object, therefore, of the invention is to provide an improved pipe machining apparatus having means for accommodating wear in the bearings of the apparatus.

Another object is to provide a pipe machining apparatus of the character described, including a plurality of individual bearing members, each of which is independently adjustable to accommodate wear thereof.

In the exemplary embodiment of the invention, generally, a pipe machining apparatus is disclosed and includes a tool carrier, with a frame attachable to a pipe for rotatably mounting the tool carrier. Means are provided for rotating the tool carrier circumferentially about the pipe. Bearing means are provided between the frame and the tool carrier. Adjusting means are provided for radially adjusting the position of the bearing means.

More particularly, the tool carrier has a circular bearing race. A plurality of roller bearings are journaled on the frame for riding in the bearing race. The adjusting means affords individual adjustment of the radial position of each roller bearing relative to the circular bearing race.

Still further, each bearing is journaled on a shaft, and each shaft is fixable to but rotatably adjustable on the frame. Eccentric means are provided between each shaft and its roller bearing whereby rotatable adjustment of any shaft radially adjusts the position of its respective bearing roller in response to rotation of the shaft.

Another feature of the invention includes means for locking the adjusting means in any position of adjustment. In the illustrated embodiment of the invention, the locking means is effective to lock each shaft in any position of rotatable adjustment. Specifically, each shaft has a threaded distal end, and a lock nut is threaded onto the shaft. Preferably, the distal end of the shaft and the lock nut are located exteriorly of the frame to facilitate rotating the shaft and adjusting the respective bearing roller from outside the apparatus.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
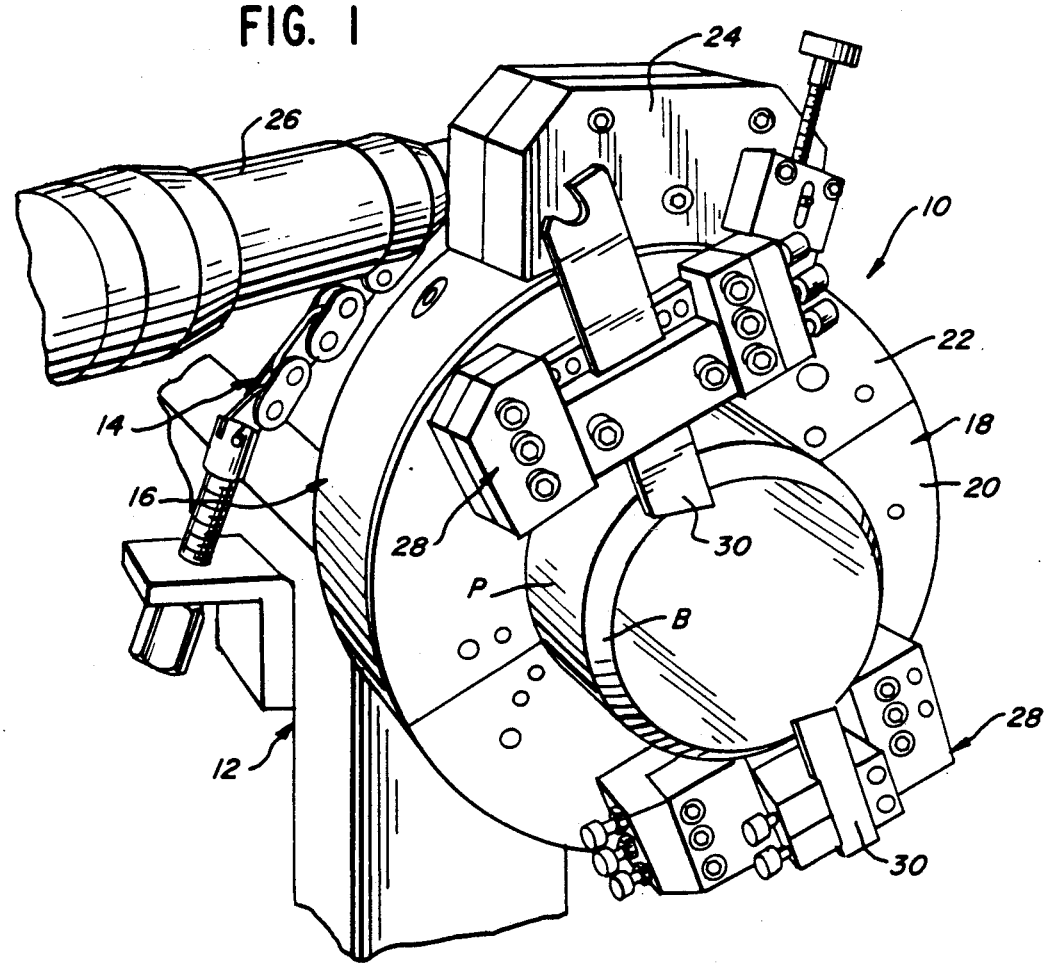
FIG. 1 is a perspective view of a pipe machining apparatus incorporating the invention.

Referring to the drawings in greater detail, and first to FIG. 1, a pipe machining apparatus is shown and generally designated 10. The apparatus is shown in association with a pipe P which is clamped to a jig or fixture, generally designated 12, by means of a clamping chain device, generally designated 14, in known fashion.

Pipe machining apparatus 10 has a frame, indicated generally at 16, formed of two joined-together semicircular sections (not visible in FIG. 1) and which rotatably mounts a tool carrier, indicated generally at 18, composed of two semicircular sections 20 and 22.

Frame 16 has a column 24 extending outwardly of the frame to have a part thereof radially outward of tool carrier 18 and which mounts a suitable drive motor 26, such as an air motor with suitable gear reduction means. As will be described hereinafter, the air motor is effective to rotate tool carrier 18 relative to frame 16 by means of a gear train through column 24.

As is known in the art, rotatable tool carrier 18 includes one or more tool heads, generally designated 28, which mounted cutting tools 30 for performing a cutting or machining operation on pipe P as the tools rotate circumferentially about the pipe. As shown, the machining operation performed by tools 30 may be such as to form a bevel B on an end of pipe P.

Figure 3:
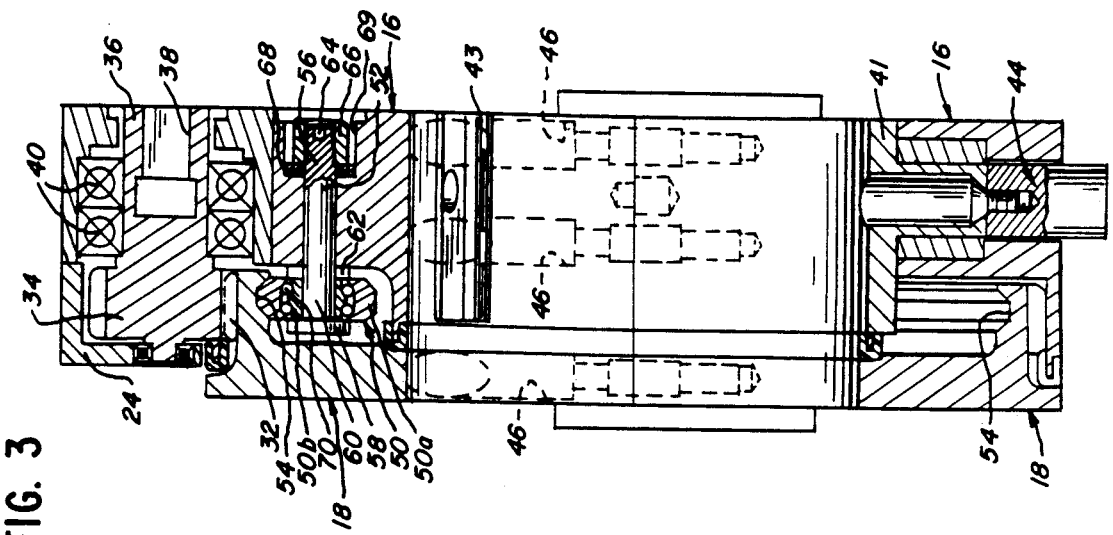
FIG. 3 is a vertical section taken generally along line 3—3 of FIG. 2.
Figure 2:
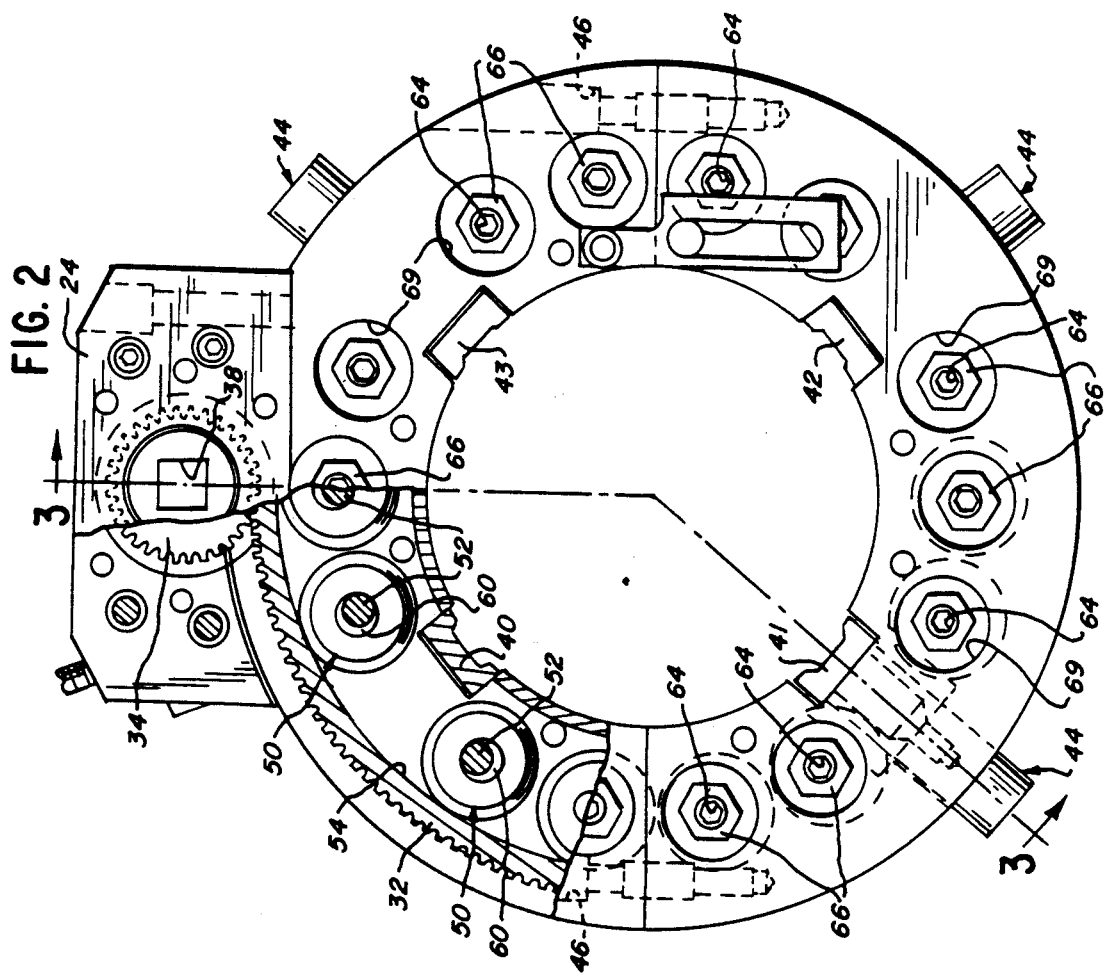
FIG. 2 is a rear elevational view of the apparatus, on an enlarged scale, with portions of the frame broken away, and the tool heads removed to facilitate the illustration.

Referring to FIGS. 2 and 3 in conjunction with FIG. 1, it can be seen that tool carrier 18 has a circular gear rack 32 for meshing with a pinion gear 34 rotatably mounted in column 24. The bevel gear has a shaft portion 36 (FIG. 3) provided with a square socket 38 for receiving an appropriate drive head of drive motor 26 (FIG. 1). Shaft portion 36 is journaled in column 24 by means of bearings 40. Therefore, it can be seen that drive motor 26 is effective to rotate tool carrier 18 relative to frame 16 through a gear train provided by pinion gear 34 in column 24 and circular gear rack 32 on the tool carrier.

FIGS. 2 and 3 also show four adjustable clamp members 40,41,42 and 43 which can be brought into engagement with the exterior of the pipe and suitable adjusted by adjusting means, generally designated 44, n a known manner to locate frame 16 concentrically with the pipe. Again in known manner, the semicircular sections of frame 16 and tool carrier 18 are assembled through access holes 46 in the frame and tool carrier.

As best seen in FIG. 3, tool carrier 18 is rotatably mounted on frame 16 by a plurality of roller bearings, generally designated 50. Each roller bearing is journaled on a shaft 52 rotatably adjustable in frame 16, as described below. The roller bearings ride in a circular bearing race 54 on the interior of tool carrier 18. The invention generally contemplates means for individually adjusting the radial position of each roller bearing 50 relative to the circular bearing race 54.

Figure 4:
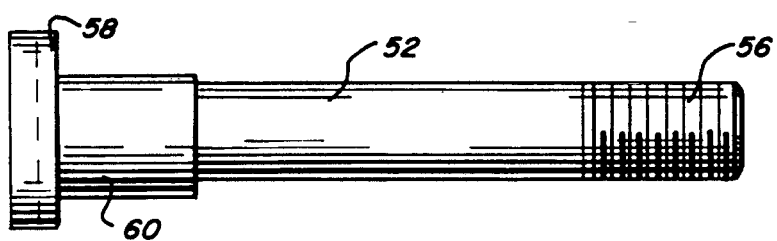
FIG. 4 is an elevational view, on an enlarged scale, of one of the eccentric shafts for one of the roller bearings.
Figure 5:
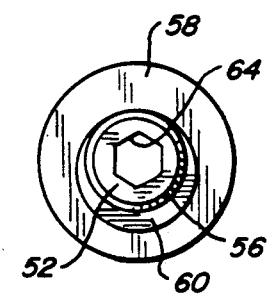
FIG. 5 is an elevational view looking toward the right-hand end of FIG. 4.

Before proceeding with a description of the adjusting means for the bearings, reference is made to FIGS. 4 and 5 where one of the shafts 52 is shown in enlarged detail. Specifically, each shaft has threaded distal end 56 and an enlarged head 58 at the opposite end. The shaft has an eccentric portion 60 immediately inside enlarged head 58.

Turning back to FIGS. 2 and 3, and specifically as shown in FIG. 3, each roller bearing 50 circumscribes eccentric portion 60 of shaft 52. Therefore, it can be understood that the radial position of each roller bearing 50 relative to bearing race 54 can be changed or adjusted in response to rotational adjustment of shaft 52.

To this end, roller bearing 50 is sandwiched between enlarged head 58 of shaft 52 and a bushing 62 which engages frame 16. The opposite end of shaft 52 is provided with a hexagonal socket 64 for receiving an appropriate wrench to rotate the shaft and eccentric 60 which is effective to adjust the radial position of roller bearing 50. It can be seen that the threaded distal end 56, including socket 64, is located exteriorly of frame 16 to facilitate adjusting the bearings from outside the apparatus.

In order to lock the bearings in any position of radial adjustment, a lock nut 66 is threaded onto distal end 56 of shaft 52 over washers 68. Once the shaft is rotated by a wrench to bring the respective roller bearing into proper engagement with bearing race 54, nut 66 is tightened to lock the bearing in the particular radial position of adjustment. The lock nuts and the respective distal ends of the shafts are located in access means in the form of recesses 69 in frame 16.

In the illustrated embodiment, it can be seen in FIG. 3 that each roller bearing 50 actually includes an outer circular bearing part 50a and an inner hub 50b. Bearing part 50a is freely rotatable about hub 50b by means of ball bearings 70. The hub 50b is press fit over eccentric portion 60 of shaft 52 and is positioned between enlarged head 58 of the shaft and bushing 62 when the bearing is locked in a given position, while outer bearing part 50a is free to rotate and ride along bearing race 54.

From the foregoing, it can be seen that the pipe machining apparatus of this invention has a novel means for adjusting the bearing means between the frame and the tool carrier to compensate for wear of the bearings during use. Each bearing is individually adjustable to accommodate uneven wear between the individual bearings themselves. Furthermore, the adjustment of each bearing can be performed exteriorly of the apparatus without dismantling or otherwise interfering with the position of the apparatus on a pipe.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A pipe machining apparatus comprising, a tool carrier, a frame attachable to a pipe for mounting the tool carrier for rotation about a first axis, means for rotating the tool carrier circumferentially about the pipe, a plurality of bearings on one of the frame and the tool carrier and each having an annular surface for engaging the other of the frame and tool carrier to guide relative rotational movement therebetween, said annular surface having an axis substantially parallel to the first axis, and adjusting means for individually adjusting the radial position of the radially facing surface on each bearing independent of any other bearing.

2. A pipe machining apparatus comprising, a tool carrier, a frame attachable to a pipe for rotatably mounting the tool carrier, means for rotating the tool carrier circumferentially about the pipe, a plurality of rotatable bearings each with an annular bearing surface between the frame and the tool carrier, each bearing being journaled on a shaft for rotation about an axis, the shaft being rotatably adjustable on one of said tool carrier and frame, and eccentric means operatively associated with the shaft for adjusting the radial position of the annular surface of each bearing in response to rotational adjustment of the shaft about the bearing shaft axis.

3. The pipe machining apparatus of claim 2 wherein said eccentric means is operatively associated between the shaft and its respective bearing.

4. The pipe machining apparatus of claim 2, including locking means for locking each shaft in any position of rotatable adjustment.

5. The pipe machining apparatus of claim 4 wherein said locking means include a lock nut and a threaded portion of the shaft for receiving the lock nut.

6. The pipe machining apparatus of claim 2 wherein a distal end of each shaft is located exteriorly of the frame to facilitate rotating the shaft and adjusting the bearing means from outside the apparatus.

7. A pipe machining apparatus comprising, a tool carrier having a circular bearing race, a frame attachable to a pipe for rotatably mounting the tool carrier, means for rotating the tool carrier circumferentially about the pipe, a plurality of roller bearings journaled on the frame for riding in the bearing race of the tool carrier, each said roller bearing having an annular bearing surface, and adjusting means for individually adjusting the radial position of the annular bearing surface of each roller bearing independently of any other roller bearing relative to the circular bearing race.

8. The pipe machining apparatus of claim 7, including means for locking the adjusting means in any position of adjustment.

9. A pipe machining apparatus comprising, a tool carrier, a frame attachable to a pipe for rotatably mounting the tool carrier, means for rotating the tool carrier circumferentially about the pipe, a plurality of rotatable bearings each respectively journaled on a shaft between the frame and the tool carrier, each said bearing having an annular bearing surface with a center axis, and adjusting means for adjusting the radial position of the annular bearing surfaces of the rotatable bearings including eccentric means operatively associated with the shaft for effecting radial movement of the annular bearing surfaces as an incident of the shafts being rotated about an axis spaced from and parallel to the center axis.

10. A pipe machining apparatus comprising, a tool carrier having a circular race, a frame attachable to a pipe for rotatably mounting the tool carrier, means for rotating the tool carrier circumferentially about the pipe, a plurality of roller bearings each with an annular bearing surface having an axis journaled on the frame for riding in the bearing race of the tool carrier, and adjusting means for individually adjusting the radial position of each roller bearing annular surface relative to the circular bearing race, said adjusting means including eccentric means rotatable about an axis offset from each roller bearing axis and residing inside the diameter of the annular bearing surface for radially moving the annular bearing surface as an incident of the adjusting means being rotated about its axis.

11. A pipe machining apparatus comprising, a tool carrier having a circular race, a frame attachable to a pipe for rotatably mounting the tool carrier, means for rotating the tool carrier circumferentially about the pipe, a plurality of roller bearings journaled on the frame for riding in the bearing race of the tool carrier, each roller bearing being journaled on a shaft having a rotational axis extending substantially parallel to the axis of rotation of the tool carrier, and adjusting means for individually adjusting the radial position of each roller bearing relative to the circular bearing race, said adjusting means including eccentric means on each said shaft for effecting radial repositioning of each roller bearing as an incident of the shaft being rotated about its axis.

12. The pipe machining apparatus of claim 11 wherein a distal end of each shaft is located exteriorly of the frame to facilitate rotating the shaft and adjusting the bearing means from outside the apparatus.

13. The pipe machining apparatus of claim 11 wherein said eccentric means is operatively associated between the shaft and its respective bearing.

14. The pipe machining apparatus of claim 11, including locking means for locking each shaft in any position of rotatable adjustment.

15. The pipe machining apparatus of claim 14 wherein said locking means include a lock nut and a threaded portion of the shaft for receiving the lock nut.

16. The pipe machining apparatus of claim 15 wherein said threaded portion of each shaft is located on a distal end of the shaft exposed exteriorly of the frame.

17. The pipe machining apparatus of claim 16 wherein said frame has recesses within which the distal ends of the shafts and the lock nuts are located.

* * * * *